United States Patent

Venkateswar et al.

Patent Number: 5,490,009
Date of Patent: Feb. 6, 1996

[54] ENHANCED RESOLUTION FOR DIGITAL MICRO-MIRROR DISPLAYS

[75] Inventors: Vadlamannati Venkateswar, Plano; William E. Nelson, Dallas, both of Tex.

[73] Assignee: Texas Instruments Incorporated, Dallas, Tex.

[21] Appl. No.: 332,023

[22] Filed: Oct. 31, 1994

[51] Int. Cl.$^6$ .................................................. G02B 26/00
[52] U.S. Cl. .................... 359/291; 359/224; 359/317; 359/259; 348/755; 348/771
[58] Field of Search .................................. 359/213, 223, 359/224, 226, 230, 291, 317, 292, 846, 847, 255, 259; 348/203, 755, 770, 771

[56] References Cited

U.S. PATENT DOCUMENTS

| | | | |
|---|---|---|---|
| 4,406,521 | 9/1983 | Mir et al. | 359/259 |
| 4,636,807 | 1/1987 | Head | 359/255 |
| 4,662,746 | 5/1987 | Hornbeck | 359/223 |
| 4,801,194 | 1/1989 | Agostinelli et al. | 359/259 |
| 4,956,619 | 9/1990 | Hornbeck | 359/317 |
| 4,967,063 | 10/1990 | Wang et al. | 359/291 |
| 5,041,851 | 8/1991 | Nelson | 346/160 |
| 5,061,049 | 10/1991 | Hornbeck | 359/224 |
| 5,079,544 | 1/1992 | DeMond et al. | 345/84 |
| 5,083,857 | 1/1992 | Hornbeck | 359/291 |

*Primary Examiner*—Loha Ben
*Attorney, Agent, or Firm*—Julie L. Reed; Richard L. Donaldson; Rene E. Grossman

[57] ABSTRACT

A display system (20) that uses multiple SLMs (25) to enhance horizontal or vertical resolution, or both. For example, to approximate a two-fold increase in horizontal resolution, the input data is sampled at a doubled rate, and each SLM (25) receives every other sample. Each SLM (25) generates an image, and the two images are partially superposed with a horizontal offset and simultaneously displayed. The resulting output image has a perceived resolution that approximates that of an image generated by an SLM with twice as many pixels per row.

10 Claims, 5 Drawing Sheets

—— "EVEN" IMAGE
---- "ODD" IMAGE

—— "EVEN" IMAGE
---- "ODD" IMAGE 5,490,009

ENHANCED RESOLUTION FOR DIGITAL MICRO-MIRROR DISPLAYS

TECHNICAL FIELD OF THE INVENTION

This invention relates to spatial light modulators, and more particularly to a method of using multiple spatial light modulators in an image display system to enhance resolution.

BACKGROUND OF THE INVENTION

Spatial light modulators (SLMs) are commonly used for image display applications. In general, an SLM is an array of individually addressable pixels. Many SLMs are binary, having an address scheme that switches the pixels to either to an "on" or an "off" state to form the image. Various modulation and integration schemes are used to provide greyscale images.

One type of SLM is a digital micro-mirror device (DMD), sometimes referred to as a deformable mirror device. The DMD has an array of hundreds or thousands of tiny tilting mirrors, which are the pixels. To permit the mirrors to tilt, each is attached to one or more hinges mounted on support posts, and spaced by means of an air gap over underlying control circuitry. The control circuitry provides electrostatic forces, which cause each mirror to selectively tilt. For display applications, image data is loaded to the DMD, and in accordance with the data, light is selectively reflected or not reflected from each mirror to an image plane.

For display systems that are based on SLMs, a conventional method for increasing resolution of the image is to increase the number of pixels in the SLM array. Thus, for increased horizontal resolution, more samples of data per row are generated and an SLM having more pixels per row is used. For increased vertical resolution, more rows of data are generated and an SLM having more rows per image is used. A drawback of this approach is that the SLM is more complex, and therefore more expensive. Also, unless the size of the pixels of the SLM is adjusted, an increase in the number of pixels per row without the proportionate increase in the number of rows, or vice versa, will alter the aspect ratio of the output image.

SUMMARY OF THE INVENTION

One aspect of the invention is a method of enhancing the horizontal or vertical resolution of a spatial light modulator (SLM) -based display, system. For enhancing horizontal resolution, a number, n, of SLMs receive sampled image data such that every nth SLM receives data representing every nth sample. The SLMs are focussed to an image plane, such that the sub-images generated by the SLMs are partially superposed with a horizontal offset from each other. The sub-images are then simultaneously displayed. For enhancing vertical resolution, a number, n, of SLMs receive data representing every nth row of image data. The SLMs are focussed to an image plane, such that the sub-images generated by said SLMs are partially superposed with a vertical offset from each other. The sub-images are then simultaneously displayed.

An advantage of the invention is that it uses the same SLMs as are used for display systems with lesser resolution, and achieves the enhanced resolution by merely increasing the number of SLMs per system. Also, the invention permits the use of square pixels for enhancing resolution, but without affecting the aspect ratio of the image.

DETAILED DESCRIPTION OF THE INVENTION

For purpose of example, the following description is in terms of display systems whose spatial light modulators (SLMs) are digital micro-mirror devices (DMDs). However, the same concepts apply to display systems that use other types of SLMs. For example, a display system having an array of liquid crystal pixels instead of a DMD array could be devised with appropriate modifications to the systems described below.

In general, the invention provides a display system with enhanced resolution, by merely increasing the number of SLMs. Either horizontal or vertical resolution, or both, can be enhanced. For example, to approximate a twofold increase in horizontal resolution, the system uses two SLMs, each having x pixels per row and y rows. Each of the two SLMs provides a "sub-image", generated from alternating samples of data, with the sampling rate providing 2(x) samples per row. The two images are partially superposed, with a horizontal offset of ½ the center-to-center horizontal spacing of the pixels of the SLM. The resulting image has a perceived quality approaching that of a system that generates a single image from an SLM having 2(x) pixels per row.

DMD Overview

Figure 1:
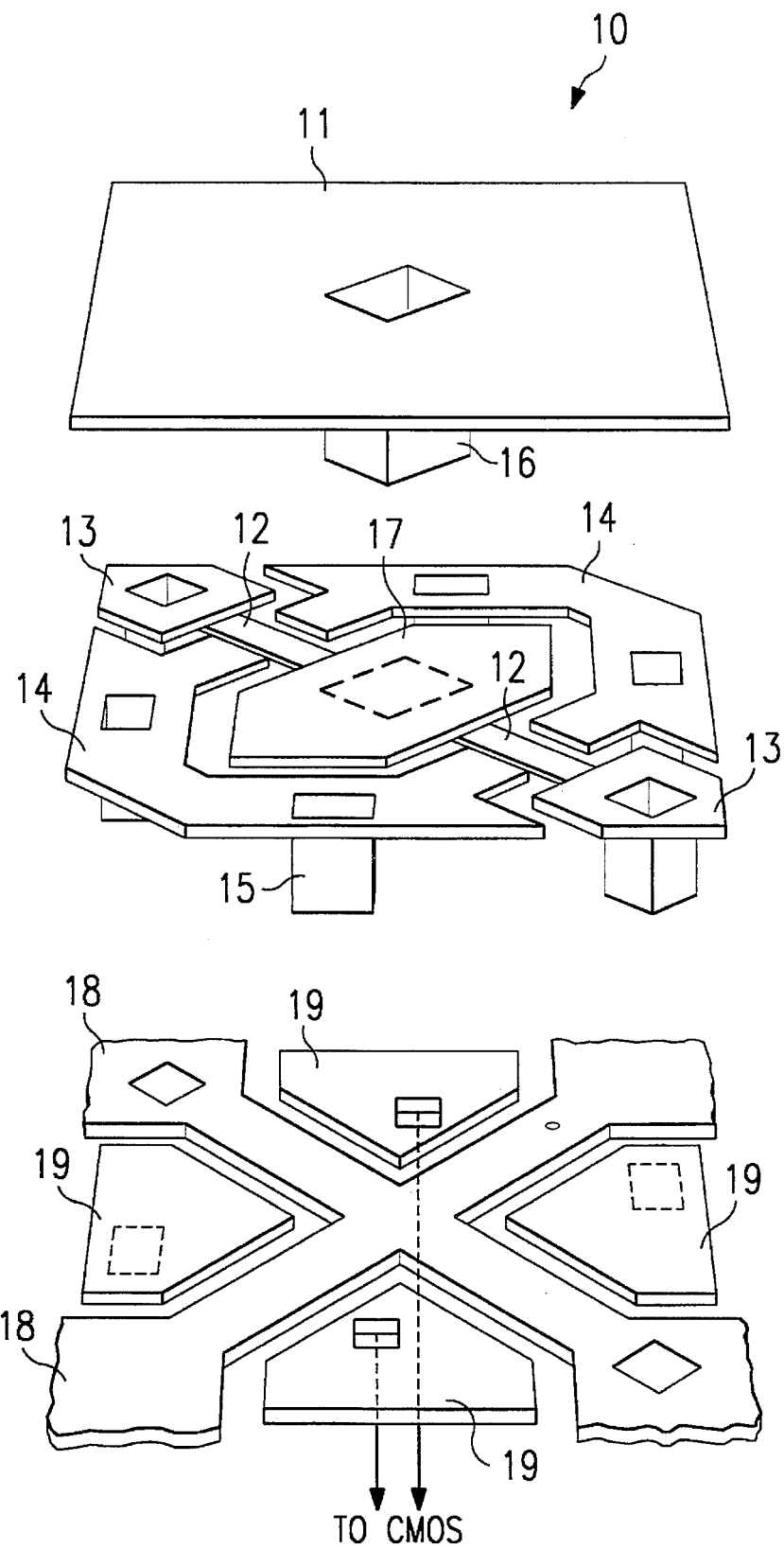
FIG. 1 illustrates one pixel element of a digital micro-mirror device (DMD), suitable for use in a DMD array in accordance with the invention.

FIG. 1 is an exploded perspective view of a single mirror element 10 of a DMD array. As explained below, to implement the invention, DMD-based display systems have multiple arrays of mirror elements 10. In a typical DMD array, each mirror element 10 is about 16 microns square, and the center-to-center spacing of mirror elements 10 is about 17 microns.

For purposes of example, mirror element 10 is a hidden-hinge type mirror element. As with other DMD designs, mirror element 10 has at least one hinge 12. Hinge 12 is supported between hinge support posts 13. Address electrodes 14 are supported by electrode support posts 15 on the same level as hinges 12 and hinge support posts 13. Mirror 11 is fabricated above the level of hinge 12 and electrodes 14 and is supported by mirror support post 16.

Mirror support post 16 is fabricated over a landing yoke 17, which is attached to hinge 12. The hinge support posts 13 and electrode support posts 15 support the hinges 12, address electrodes 14, and landing yoke 17 over a control bus 18 and electrode pads 19. When mirror 11 is tilted, the tip of the landing yoke 17 contacts control bus 18. The control bus 18 and landing pads 19 have appropriate electrical contacts with a substrate of address and control circuitry, which is typically fabricated using CMOS fabrication techniques.

Another type of mirror element that can be used in DMD arrays in accordance with the invention is the torsion beam type, whose hinges extend from opposing sides of the mirror, rather than being under the mirror. Other types of suitable mirror elements are cantilever beam types and flexure beam types. Various DMD types are described in U.S. Pat. No. 4,662,746, entitled "Spatial Light Modulator and Method"; U.S. Pat. No. 4,956,619, entitled "Spatial Light Modulator"; U.S. Pat. No. 5,061,049 entitled "Spatial Light Modulator and Method"; U.S. Pat. No. 5,083,857 entitled "Multi-level Deformable Mirror Device"; and U.S. patent Ser. No. 08/171,303, entitled "Improved Multi-Level Digital Micromirror Device". Each of these patents is assigned to Texas Instruments Incorporated and each is incorporated herein by reference.

In operation, voltages based on data in the memory cells of the underlying CMOS circuit are applied to the two address electrodes 14, which are located under opposing corners of mirror 11. Electrostatic forces between each mirror 11 and its address electrodes 14 are produced by selective application of voltages to the address electrodes 14. The electrostatic force causes each mirror 11 to tilt either about +10 degrees (on) or about −10 degrees (off), thereby modulating the light incident on the surface of the DMD. Light reflected from the "on" mirrors 11 is directed to an image plane. Light from the "off" mirrors 11 is reflected away from the image plane. The resulting pattern forms an image.

In effect, the mirror 11 and its address electrodes 14 form capacitors. When appropriate voltages are applied to a mirror 11 and its address electrodes 14, a resulting electrostatic force (attracting or repelling) causes the mirror 11 to tilt toward the attracting address electrode 14 or away from the repelling address electrode 14. The mirror 11 tilts until yoke 17 contacts bus 18.

Once the electrostatic force between the address electrodes 14 and the mirror 11 is removed, the energy stored in the hinge 12 provides a restoring force to return the mirror 11 to an undeflected position. Appropriate voltages may be applied to the mirror 11 or address electrodes 14 to aid in returning the mirror 11 to its undeflected position.

Display Systems

Figure 2:
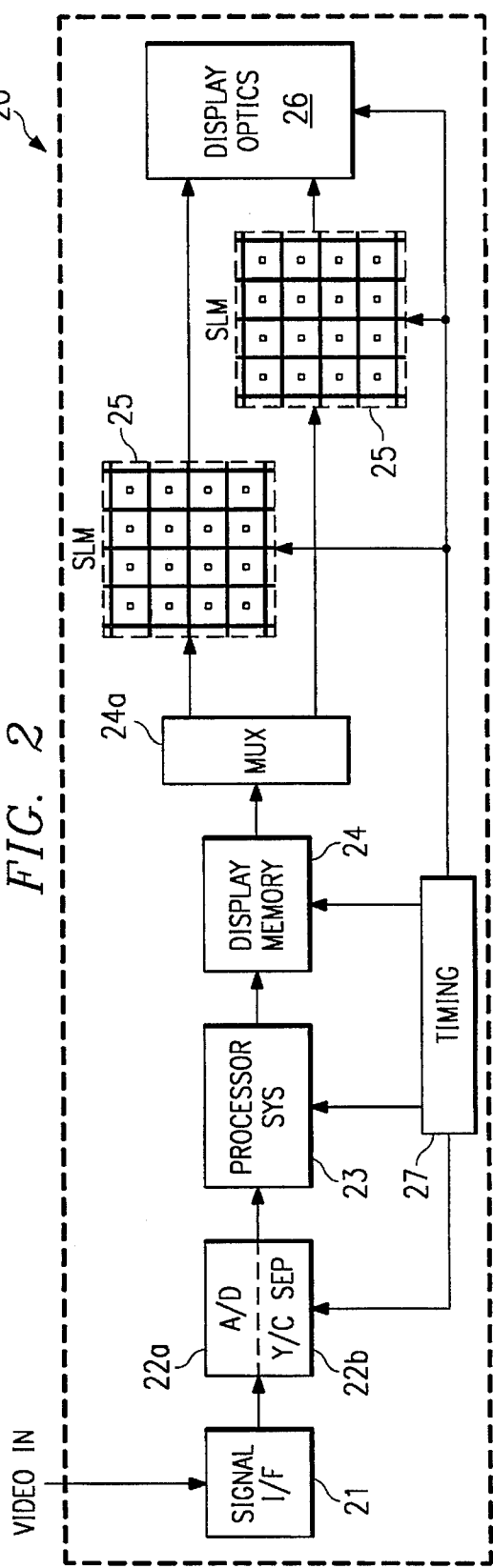
FIGS. 2 and 3 each illustrate an SLM-based display system in accordance with the invention.
Figure 3:
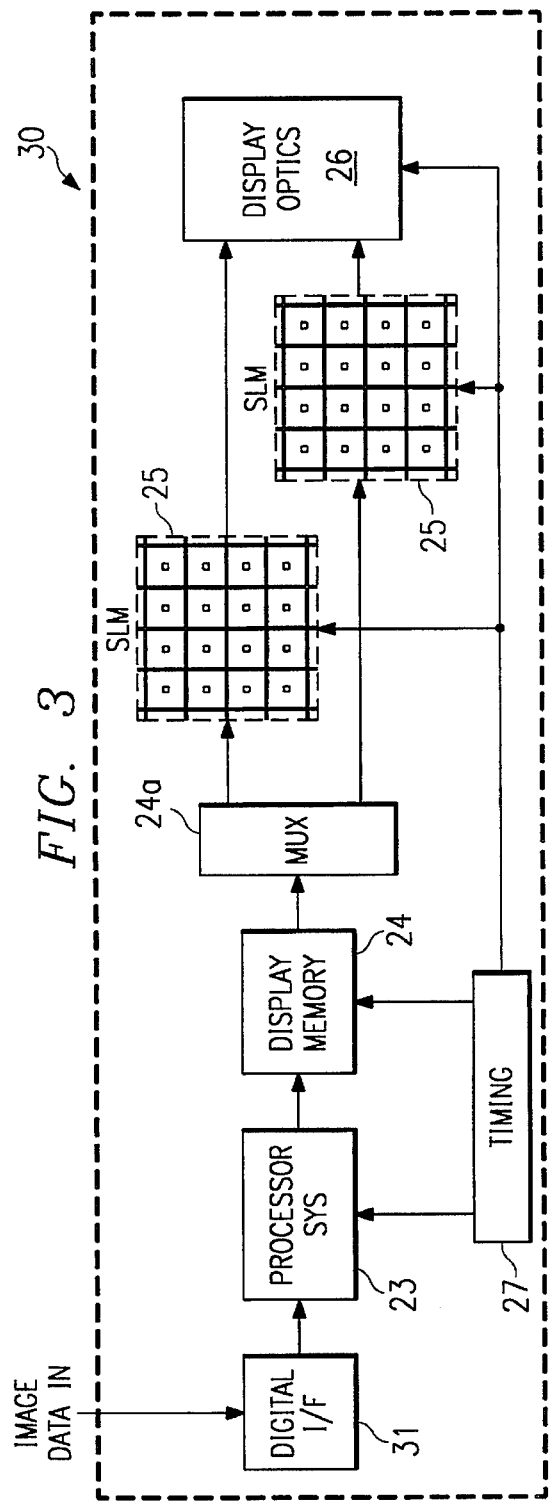

FIGS. 2 and 3 illustrate DMD-based display systems 20 and 30, respectively, each having two DMDs 25. FIG. 2 illustrates a display system 20, which receives an analog video signal such as a television broadcast signal. FIG. 3 illustrates a display system 30, which receives computer generated data. Once data in an appropriate format has been delivered to the display memory 24 of each system 20 and 30, the two systems are essentially the same. In FIGS. 2 and 3, only those components significant to mainscreen pixel data processing are shown. Other components, such as might be used for synchronization or audio signals or secondary screen features, are not shown.

In the example of this description, system 20 and system 30 approximate a two-fold increase in horizontal resolution. This calls for the use of two DMDs 25. However, in general, an n-fold increase in resolution calls for n DMDs 25. Also, as explained below, the same principle may be used to enhance vertical resolution.

For purposes of this description, the two DMDs 25 each generate a "frame" of image data, where a frame has x pixels per row and y rows. This requires the DMD array to have a minimum of x mirror elements per row and y rows. Although the DMD array could be larger, for simplicity of explanation it will be assumed that the size of the DMD array corresponds to the size of the image.

The following description briefly describes the overall structure and operation of system 20. More comprehensive descriptions of DMD-based display systems, without the enhanced resolution described herein, are set out in U.S. Pat. No. 5,079,544, entitled "Standard Independent Digitized Video System", in U.S. patent Ser. No. 08/147,249 (Atty Dkt No. TI-17855), entitled "Digital Television System", and in U.S. patent Ser. No. 08/146,385 (Atty Dkt No. TI-17671), entitled "DMD Display System". Each of these patents is assigned to Texas Instruments Incorporated, and each is incorporated by reference herein.

Signal interface unit 21 receives an analog video signal and separates video, synchronization, and audio signals. It delivers the video signal to A/D converter 22a and Y/C separator 22b, which convert the data into pixel-data samples and which separate the luminance ("Y") data from the chrominance ("C") data, respectively. In FIG. 2, the signal is converted to digital data before Y/C separation, but in other embodiments, Y/C separation could be performed before A/D conversion, using analog filters.

For a system 20 having two SLMs 25, the sample rate of A/D converter 22a provides samples for twice the number of pixels per row of the image generated by each SLM 25 In other words, where each of two SLMs 25 generates an image with x pixels per row and y rows, the sample rate provides 2x samples per row. As explained below, the perceived image is comprised of two "sub-images", which are partially superposed. This perceived image has a quality that approximates the quality of an image with 2x pixels per row from a single SLM having 2x pixel elements. More generally for a perceived image quality that approximates that of a single SLM having n(x) pixel elements per row, the sample rate provides n(x) samples per row.

Processor system 23 prepares the data for display by performing various pixel data processing tasks. Processor system 23 includes whatever processing memory is useful for such tasks, such as field and line buffers. The tasks performed by processor system 23 may include linearization (to compensate for gamma correction), colorspace conversion, and line generation. The order in which these tasks are performed may vary.

Display memory 24 receives processed pixel data from processor system 23. It formats the data, on input or on output, into "bit-plane" format, and delivers the bit-planes to SLMs 25, one bit-plane at a time. The bit-plane format permits each mirror element 10 of SLMs 25 to be turned on or off in response to the value of one bit of data at a time. For samples of data having n bits per sample, there are n bit-planes per frame.

In a typical display system 20, display memory 24 is a "double buffered" memory, which means that it has a capacity of at least two display frames of data. The buffer for one display frame can be read out to SLMs 25 while the buffer for another display frame is being written. The two buffers are controlled in a "ping-pong" manner so that data is continuously available to SLMs 25.

Various techniques can be used to address SLMs 25 to provide greyscale images. U.S. Pat. No. 5,278,652, entitled "DMD Architecture and Timing for Use in a Pulse-Width Modulated Display System", describes such techniques. This patent is assigned to Texas Instruments Incorporated, and is incorporated herein by reference. Some of the techniques discussed therein include clearing blocks of mirror elements 12, using extra "off" times to load data, and of breaking up the time in which more significant bits of data of each sample are displayed. These techniques can be applied to a system 20 having multiple DMDs 25 in accordance with the invention. However, in general, addressing of SLMs 25 is on a bit-plane basis, with all bit-planes for a frame being displayed during a frame period. For purposes of this invention, each of n number of SLMs 25 receives data representing every nth sample of a bit-plane.

In accordance with example of this description, where system 20 has two DMDs 25, each DMD 25 receives data representing every other sample (even or odd) of each row of the image. The allocation of data between DMDs 25 is achieved by some sort of multiplexing operation, either on input to, or on output from, memory 24. In FIG. 2, a multiplexer 24a at the output of memory 24, performs this function.

In the example of this description, each DMD 25 has square mirror elements 10 with a center-to-center horizontal spacing of a distance, D. Each DMD 25 is configured for a PAL format, which has 576 rows and an aspect ratio of 4:3. For square mirror elements, the PAL format calls for each DMD 25 to have an array that is at least 768 mirror elements per row and at least 576 rows of mirror elements. A "frame" of image data is comprised of 576 rows of samples, each row having 768 samples.

Display optics unit 26 has optical components for receiving the images from DMDs 25 and for focussing them to an image plane such as a display screen. For color displays, the bit-planes for each color could be sequenced and synchronized to a color wheel that is part of display optics unit 26. Master timing unit 27 provides various system control functions.

Figure 4A:
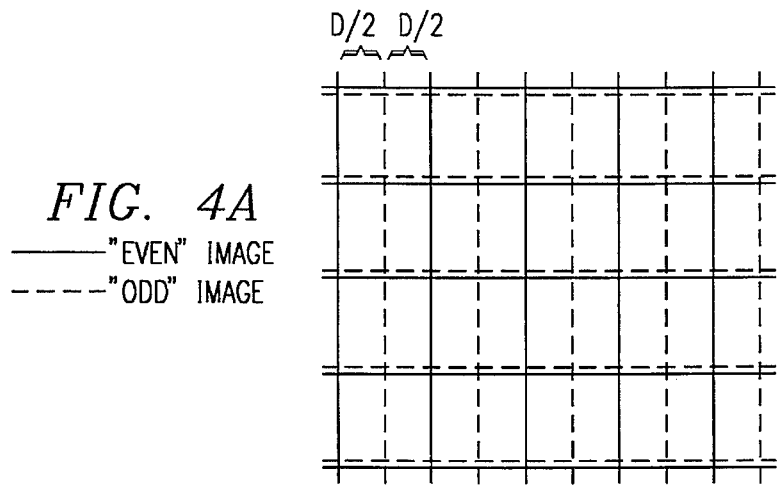
FIG. 4A illustrates a portion of the partially superposed images generated by the DMDs of FIG. 2 or FIG. 3, which has enhanced horizontal resolution in accordance with the invention.

FIG. 4A illustrates the two partially superposed images generated by display system 20, which are simultaneously projected to the image plane. Each DMD 25 provides one of these "sub-images". One sub-image is comprised of even pixels from even data samples. The other sub-image is comprised of odd pixels from odd data samples. Thus, one image is an "even" pixel image, and the other an "odd" pixel image. These two images are horizontally displaced relative to each other by a distance of ½ the center-to-center horizontal spacing of the mirror elements. Thus, in the example of this description, the displacement is a distance of D/2. More generally, for a system having n DMDs 25, the displacement of the sub-images are in increments of 1/n the center-to-center horizontal spacing between mirror elements 10. As another example, a system having three DMDs for approximately a three-fold increase in horizontal resolution would have its sub-images offset so that the second is horizontally offset D/3 from the first, and the third is horizontally offset D/3 from the second. The perceived effect of displaying two partially superposed images in this manner is discussed below in connection with FIGS. 5–8.

Figure 4B:
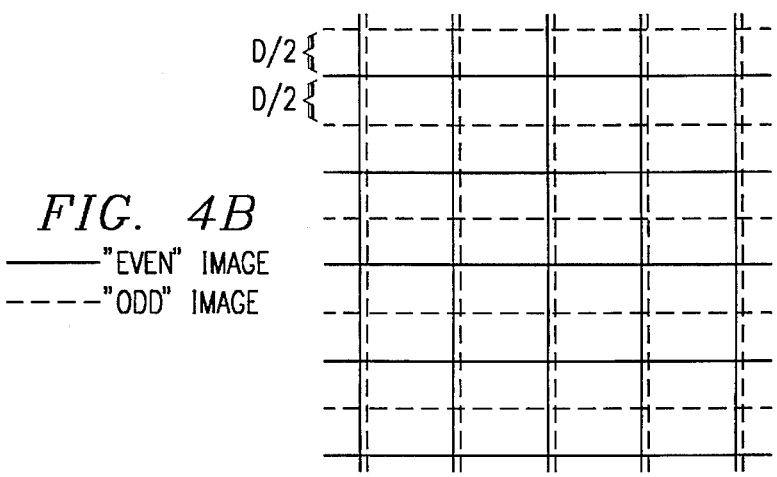
FIG. 4B illustrates a portion of a partially superposed image generated by two DMDs in a system similar to that of FIG. 2 or FIG. 3, which has enhanced vertical resolution in accordance with the invention.

FIG. 4B illustrates an alternative embodiment of the invention, in which vertical resolution rather than horizontal resolution is enhanced. In the example of FIG. 4B, the image approximates a two-fold increase in vertical resolution, which calls for the use of two DMDs 25. Where each DMD 25 provides an image with y rows, processor system 23 is programmed to provide data for 2(y) rows. Some sort of line doubling or interpolation can be used for this purpose. For a PAL format, the data has 2(576) rows of data samples. Each DMD 25 receives data for alternating rows, and each DMD 25 provides a sub-image having 768 pixels per row and 576 rows. Thus, one image is an "even" row image, and the other an "odd" row image. The two images are partially superposed, with an offset in the vertical direction of D/2, or ½ the center-to-center vertical spacing between pixel elements.

The above-described principles could be combined to provide an image that enhances both horizontal and vertical resolution. In this case, two SLMs each receive data for alternating samples and alternating rows. Two sub-images would again be partially superposed, with a displacement of D/2 in the horizontal direction and D/2 in the vertical direction.

Perceived Resolution

FIGS. 5–8 illustrate the quality of an output image generated in accordance with the invention. As explained below, a system like system 20, which has 2 DMDs with partially superposed sub-images, is used to sample and display the image.

Figure 5:
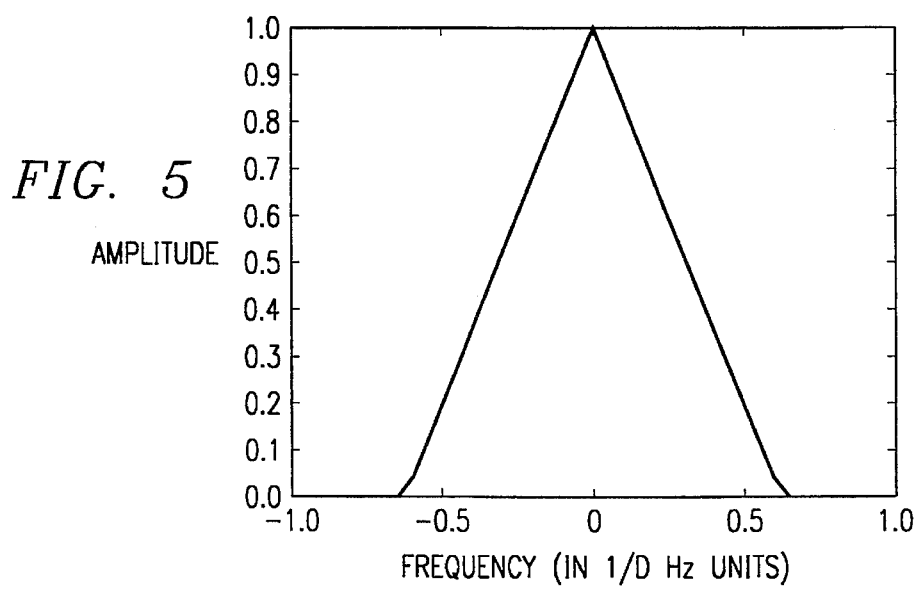
FIGS. 5–8 illustrate the perceived quality of images generated in accordance with the invention.

FIG. 5 is the frequency spectrum of an input image. For purposes of example, a one-dimensional image is assumed, but the same analysis applies to two-dimensional images.

Figure 6:
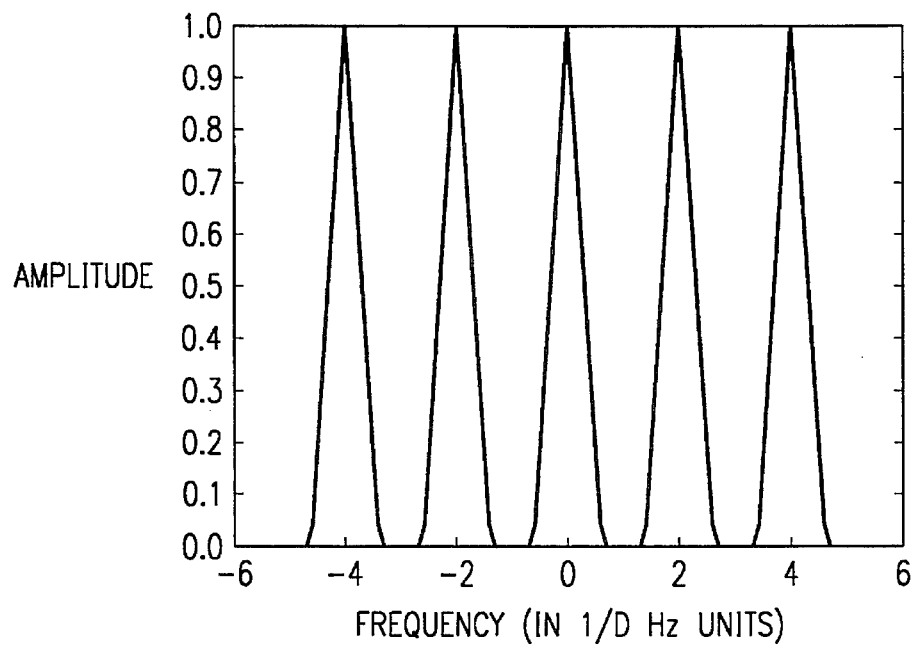

FIG. 6 illustrates the frequency spectrum of the image of FIG. 5 after sampling. In accordance with the invention, the image is sampled at a faster rate than would be used for generating an image from a single SLM 25. For example, where each of two SLMs 25 generates an image having x pixels per row, the sample rate provides 2(x) samples per row. As indicated, this sample rate is sufficiently great so as to prevent aliasing.

Figure 7:
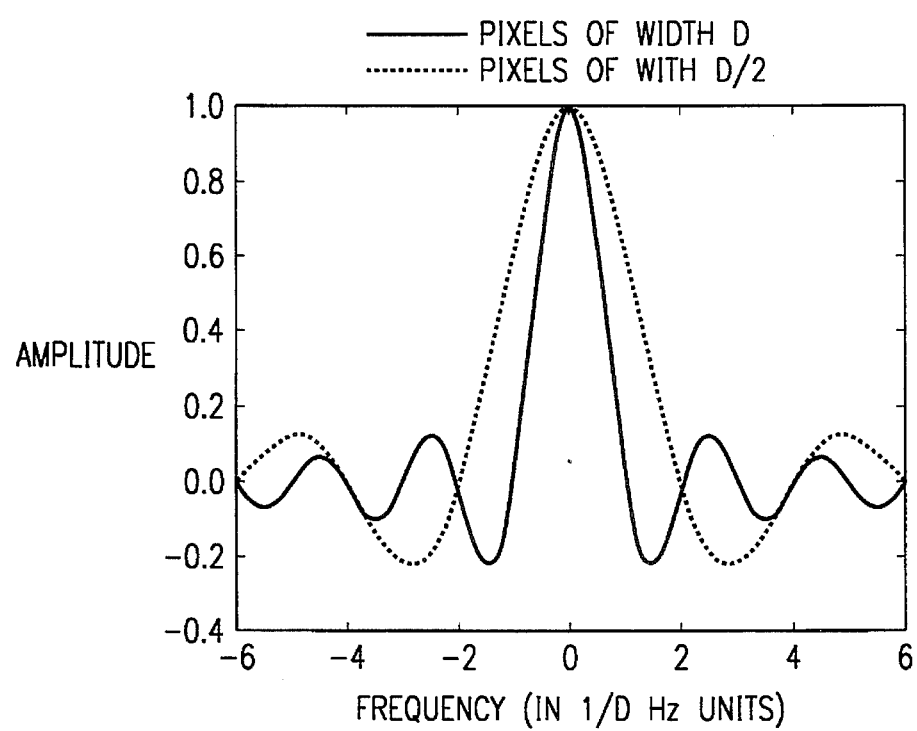

FIG. 7 illustrates two modulation transfer functions (MTFs). The MTF illustrated by the solid line is that of system 20, whose pixels are square and of width, D, and whose images are partially superposed in accordance with the invention. The MTF illustrated by the dotted line is that of a DMD having twice as many mirror elements per row, with the width of the mirror elements reduced to D/2 so as to increase horizontal resolution without affecting the aspect ratio of the output image.

Figure 8:
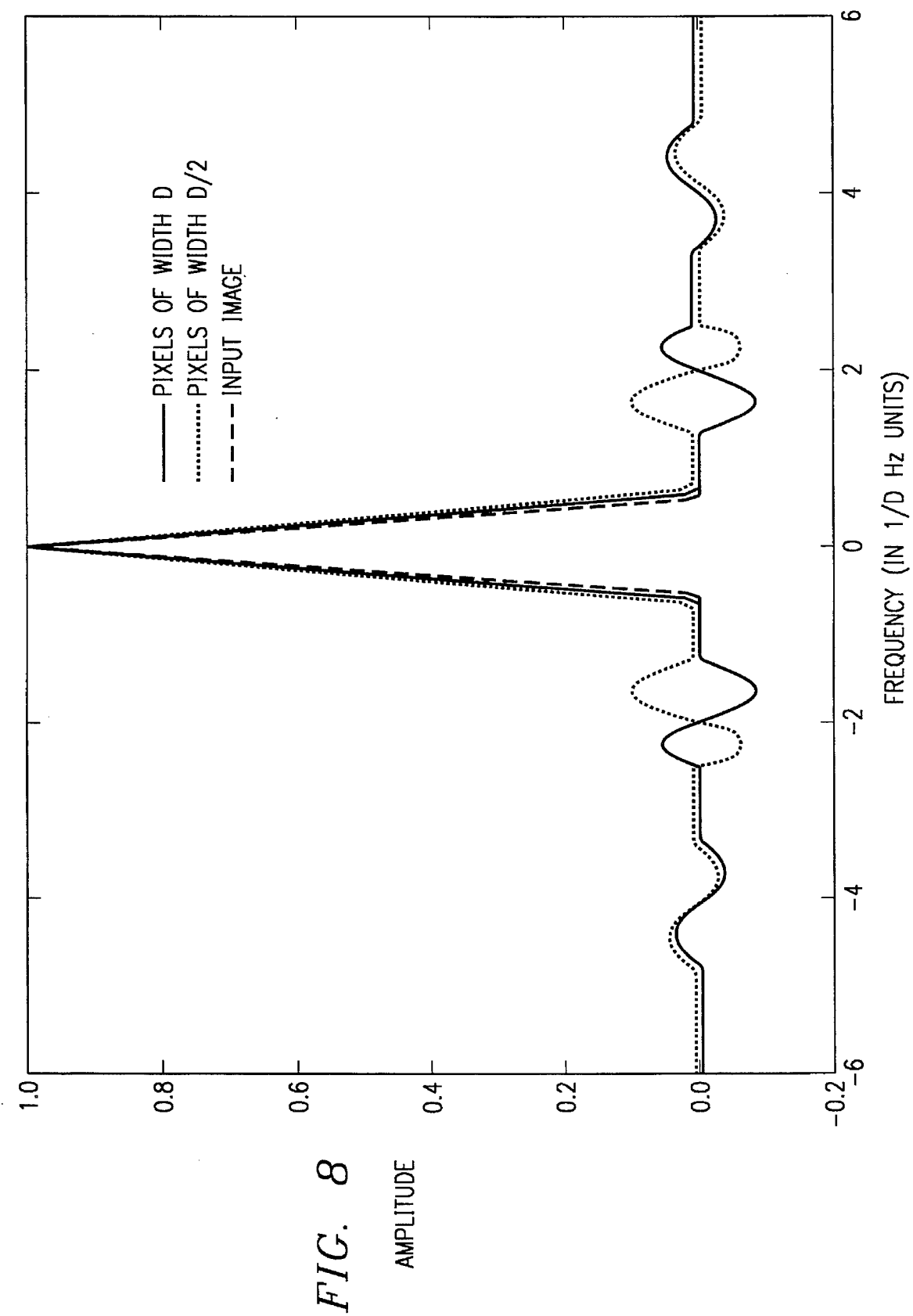

FIG. 8 illustrates the spectra of two output images, obtained by multiplying the sampled image spectrum of FIG. 6 with each MTF of FIG. 7. The output of system 20 is shown in solid line, and the output of the DMD with twice as many pixel elements per row is shown in dotted line. The input image is shown in dashed line. The difference in distortion between the two output images is minimal, which indicates that the perceived resolution of system 20 approaches that of a system with twice as many pixels per row.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of enhancing the horizontal resolution of a spatial light modulator (SLM)-based display system, comprising the steps of:

receiving sampled image data to a number, n, of SLMs, such that every nth SLM receives data representing every nth sample;

focusing said SLMs to an image plane, such that each of said SLMs generate a sub-image wherein said sub-images are partially superposed with a horizontal offset from each other; and simultaneously displaying said sub-images to form an image.

2. The method of claim 1, wherein said steps are performed with two SLMs for approximating a two-fold increase in horizontal resolution.

3. The method of claim 1, wherein said SLMs are digital micro-mirror devices.

4. The method of claim 1, wherein said focussing step is performed with offsets of approximately 1/n the center-to-center horizontal spacing of the pixel elements of said SLMs.

5. The method of claim 1, wherein said SLMs have pixel elements that are substantially square.

6. A method of enhancing the vertical resolution of a spatial light modulator (SLM)-based display system, comprising the steps of:

receiving rows of image data to a number, n, of SLMs, such that every nth SLM receives data representing every nth row of samples;

focusing said SLMs to an image plane, such that each of said SLMs generate a sub-image wherein said sub-images are partially superposed with a vertical offset from each other; and simultaneously displaying said sub-images to form an image.

7. The method of claim 6, wherein said steps are performed with two SLMs for approximating a two-fold increase in vertical resolution.

8. The method of claim 6, wherein said SLMs are digital micro-mirror devices.

9. The method of claim 6, wherein said focussing step is performed with offsets of approximately 1/n the center-to-center vertical spacing of the pixel elements of said SLMs.

10. The method of claim 6, wherein said SLMs have pixel elements that are substantially square.

* * * * *